(12) United States Patent
Shih

(10) Patent No.: US 7,012,720 B2
(45) Date of Patent: Mar. 14, 2006

(54) METHOD OF EFFACING ZIPPER IMAGE

(76) Inventor: Chen-Hsiang Shih, No. 37-3, Yung-Feng Lane, Ho-Ming Village, Hsiu-Shui Hsiang, Chang-Hua Hsien (TW)

( * ) Notice: Subject to any disclaimer, the term of this patent is extended or adjusted under 35 U.S.C. 154(b) by 923 days.

(21) Appl. No.: 10/047,680

(22) Filed: Jan. 14, 2002

(65) Prior Publication Data

US 2003/0133170 A1    Jul. 17, 2003

(51) Int. Cl.
*H04N 1/04* (2006.01)
(52) U.S. Cl. ............... 358/474; 358/400; 382/155; 382/275
(58) Field of Classification Search ........... 358/474, 358/400, 483, 489; 382/155, 275
See application file for complete search history.

(56) References Cited

OTHER PUBLICATIONS

U.S. Appl. No. 10/714,634 "Apparatus for Reducing Zipper of Image and Method Thereof". Chang et al.*

* cited by examiner

*Primary Examiner*—Edward Coles
*Assistant Examiner*—Heather D. Gibbs
(74) *Attorney, Agent, or Firm*—Berkeley Law and Technology Group, LLC

(57) ABSTRACT

A method of effacing zipper image, applicable to scan a document by a scanner with a stagger charge-coupled device. The nth (n is a positive integer) pixel obtained by scan on a scan line at which the zipper image is produced is subtracted by the (n+1)th pixel obtained by scan on the scan line. The absolute value of the result is then compared to a critical value. If the result is smaller than the critical value, the nth pixel is the nth pixel modified as the nth pixel after process.

6 Claims, 3 Drawing Sheets

METHOD OF EFFACING ZIPPER IMAGE

BACKGROUND OF THE INVENTION

1. Field of the Invention

The invention relates in general to a method of effacing zipper image, and more particularly, to a method of effacing zipper image by approximating the gray scales of two neighboring pixels.

2. Description of the Related Art

FIG. 1 shows a block diagram of a scanner having a stagger charge-coupled device. In FIG. 1, the scanner 100 is coupled to a computer 150. The scanner comprises a stagger charge-coupled device 110 with a primary line and a secondary line, an application specific integrated circuit (ASIC) 120, an image compensation buffer 130 and an I/O interface 140.

When the scanner having the stagger charge-coupled device is scanning a document, the pitch between the primary line and the secondary line is small. The primary line is thus affected by the light reflected from the secondary line. Similarly, the secondary line is also affected by the light reflected from the primary line. A zipper image (as shown in FIG. 3) in addition to a real image (as shown in FIG. 2) is thus produced by using the scanner with the stagger charge-coupled device to scan the document. When a document has a black-and-white boundary, the zipper image is more obvious, causing error in the actual image. Currently, a method to compensate the zipper image has not been found in the prior art.

SUMMARY OF THE INVENTION

The invention provides a method of effacing a zipper image by approximating the gray scales of two neighboring pixels.

The method of effacing the zipper image provided by the invention is applicable to scan a document using a scanner with a stagger charge-coupled device. The nth pixel obtained by scan on a scan line at which the zipper image is produced is subtracted by the (n+1)th pixel obtained by scan on the scan line. The absolute value of the subtraction result is compared to a critical value. When the result is smaller than the critical value, the nth pixel is modified as the nth pixel after process. If the result is larger than the critical value, no process is performed.

The processed nth pixel is one half of the sum of the nth pixel obtained by scan and the (n+1)th pixel obtained by scan.

In one embodiment of the present invention, the nth pixel after being processed is the sum of one half of the nth pixel obtained by scan and one half of the (n+1)th pixel obtained by scan.

In one embodiment of the present invention, the critical value is a predetermined value or produced by a logic circuit. The critical value can be adjusted according to the modulation transfer function of the scanner with the stagger charge-coupled device.

Both the foregoing general description and the following detailed description are exemplary and explanatory only and are not restrictive of the invention, as claimed.

DESCRIPTION OF THE PREFERRED EMBODIMENTS

Figure 1:
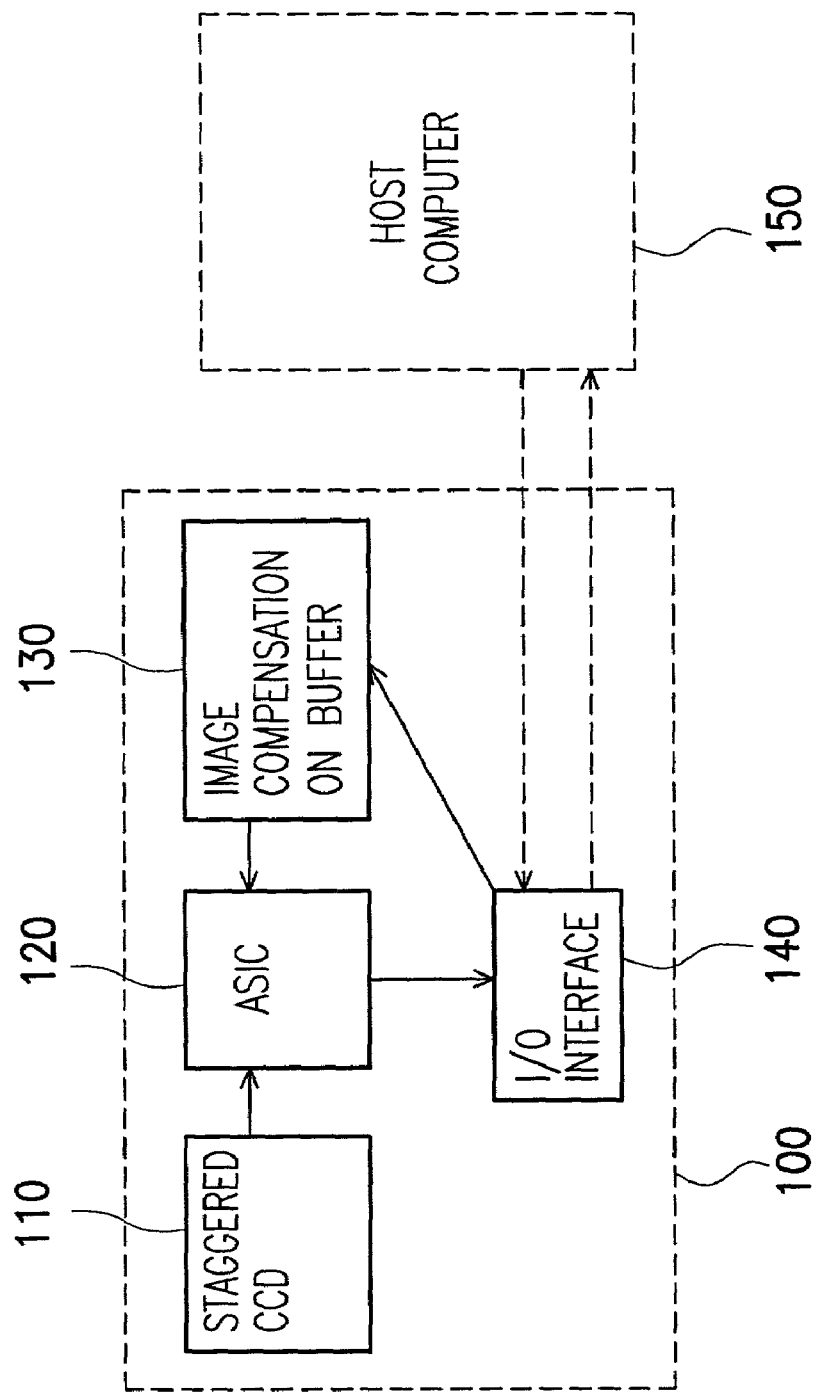
FIG. 1 shows a block diagram of a scanner with a stagger charge-coupled device.
Figure 2:
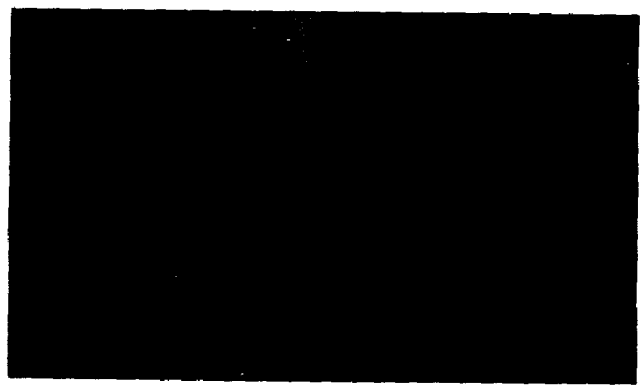
FIG. 2 shows a real image of a document.
Figure 3:
FIG. 3 shows a zipper image produced by scanning the document using a scanner with a stagger charge-coupled device.

Referring to FIG. 1, a compensation operation is performed on a document before the document is scanned by a scanner 100 with a stagger charge-coupled device 110. Thereby, an image compensation parameter is obtained and stored in a computer 150. When the stagger charge-coupled device 110 performs the scan on any part of the document, an image compensation parameter corresponding to the scanned part is retrieved from the computer 150 and transmitted to the image compensation buffer 130 via the I/O interface 140. The staggered scanned image obtained from the stagger scan by the stagger charge-coupled device 110 is then corrected by the ASIC 120 according to the image compensation parameter transmitted from the image compensation buffer 130. The corrected image is then transmitted to the computer 150 via the I/O interface 140 for storage.

However, as the distance between the primary line and the secondary line is very short, the primary line is affected by the light reflected from the secondary line. Similarly, the secondary line is also affected by the light reflected from the primary line. A zipper image is thus produced to cause an error between the scanned image and the real image.

Figure 4:
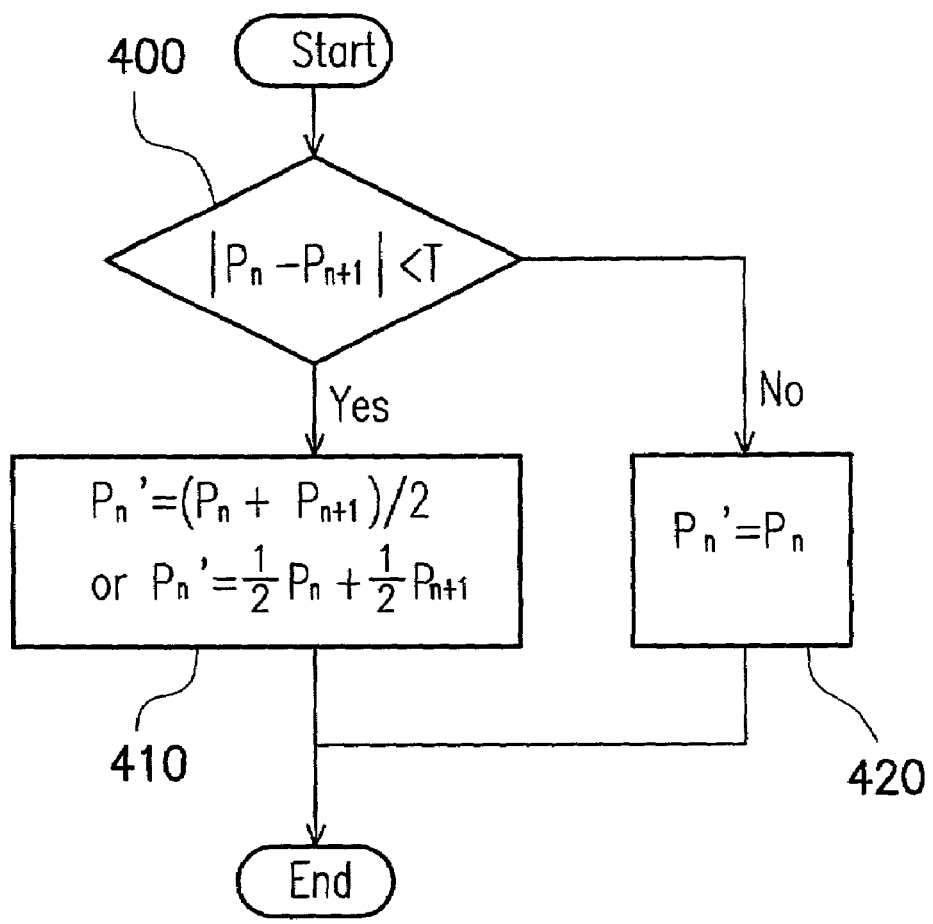
FIG. 4 shows a flow chart for a method of effacing a zipper image.

FIG. 4 shows a flow chart of effacing a zipper image according to the invention. In the following embodiment, a critical value used in the effacing process of the zipper image can be a predetermined value or a value generated by a logic circuit. In FIG. 4, assume that the nth (n is a positive integer) pixel obtained by scan on the scan line at which the zipper is produced is $P_n$, and the (n+1)th pixel obtained by scan on the scanning line is $P_{n+1}$. The nth pixel being processed is referred as $P_n'$, and the critical value is denoted as T. In this embodiment, whether $P_n$ subtracted by $P_{n+1}$ is smaller than T is determined in step s400. When the absolute value of $|P_n - P_{n+1}|$ is smaller than T, $P_n$ is modified as $P_n'$. The value of $P_n'$ can be expressed as $(P_n + P_{n+1})/2$ or $(½)P_n + (½)P_{n+1}$, as shown in step s410. The nth pixel after being processed as $P_n'$ approximates the gray values of the nth and (n+1)th pixel $P_n$ and $P_{n+1}$ obtained by scan, so that the zipper image can be effaced. When $|P_n - P_{n+1}|$ is larger than T, the effacing process is not performed.

The above embodiment compares two neighboring pixels at a scan line at which the zipper image is produced with a critical value as a reference for effacing process. If the effacing process is required, the gray values of these two neighboring pixels are approximated to each other to reduce the zipper image. However, the modulation transfer function of the scanner with the stagger charge-coupled device is slightly reduced.

According to the above, the invention has the following advantages:

1. Only a critical value is required to determine whether an effacing process is performed, thereby, two gray scales of two neighboring pixels are approximated to each other, and the zipper image is effaced.

2. The fabrication cost is not increased.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method to effacing a zipper image, applicable to scan a document using a scanner with a stagger charge-coupled device, the method comprising:

determining whether the absolute value of a result of subtracting a nth pixel obtained by scan on a scan line on which the zipper image is produced by a (n+1)th pixel obtained by scan on the scan line is smaller than a critical value; and modifying the nth pixel obtained by scan as a nth pixel after being processed if the result is smaller than the critical value.

2. The method according to claim 1, wherein the nth pixel after being processed equals to one half of a sum of the nth pixel and the (n+1)th pixel obtained by scan.

3. The method according to claim 1, wherein the nth pixel after being processed equals to one half of the nth pixel obtained by scan plus one half of the (n+1)th pixel obtained by scan.

4. The method according to claim 1, wherein the nth pixel obtained by scan is not processed if the result is larger than the critical value.

5. The method according to claim 1, wherein the critical value is a predetermined value.

6. The method according to claim 1, wherein the critical value can be adjusted according to the modulation transfer function of the scanner with the stagger charge-coupled device.

* * * * *